United States Patent

[11] 3,609,576

[72] Inventor Roger Charbonnier
Meudon, France
[21] Appl. No. 824,636
[22] Filed May 14, 1969
[45] Patented Sept. 28, 1971
[73] Assignee Adret Electronique
Trappes (Yvelines), France
[32] Priority June 18, 1968
[33] France
[31] 155,393

[54] FREQUENCY SYNTHETIZER
6 Claims, 7 Drawing Figs.

[52] U.S. Cl. .......... 331/2, 331/18, 331/27, 331/38, 331/41
[51] Int. Cl. .......... H03b 3/04
[50] Field of Search .......... 331/1 A, 2, 18, 25, 27, 38, 40, 41

[56] References Cited

UNITED STATES PATENTS 3,202,930 8/1965 Muraszko .......... 331/40 X
3,449,691 6/1969 Pasternack et al. .......... 331/18

*Primary Examiner*—Roy Lake
*Assistant Examiner*—Siegfried H. Grimm
*Attorney*—William Anthony Drucker

ABSTRACT: The invention broadly relates to frequency synthetizers including a plurality of decades, each of which receives an input frequency Fo+A originating from the preceding decade and provides an output frequency Fo+A/10+B, Fo being a fixed frequency and A and B being frequency increments varying by integral steps.

More specifically, the instant invention provides a frequency synthetizer of simplified construction wherein the group formed by the head decades essentially consists of a single oscillator cooperating with means for varying its frequency so as to obtain, without any beat with an intermediate frequency and without any injection of a carrier frequency, the variable frequency Fo+A to be applied to the following decades.

FREQUENCY SYNTHETIZER

This invention relates to electronic generator devices known as "frequency synthetizers." Such generators are adapted to deliver, from a single frequency standard, generally a quartz oscillator, a recurrent signal which has a variable recurrent frequency expressed by a number having *n* significant digits, the value of these digits being adjustable at will from 0 to 9.

The invention relates more particularly to frequency synthesizers of the "decade" type. Each decade is an electronic circuit which receives the incident frequency $F_o$+A originating from the preceding decade and, by means of a modulator, effects the additive beat between said incident frequency which has previously been divided by 10 and a variable auxiliary frequency, 9 F0/10+B, F0 being a fixed so-called "carrier" frequency, and A and B being frequency increments varying by integral steps, this beat finally giving a frequency $F_o$+A/10+B. As a varying embodiment, it is possible to obtain this latter frequency by effecting more than one beat and by using to this effect more than one auxiliary frequency.

Known frequency synthesizers of this type comprise *n* decades: the first decade or units decade provides the frequency $F_o+10^nU_1$, the second decade or tens decade provides the frequency $F_o+10^nU_2+10^{n11}U_1$ and so on up to the (n−1th decade which provides the frequency $F_o+10^nU_{n}{}^{1}{}_{1}+10^{n11}U_{n12}$ $+\ldots 10\,U_2+U_1$, $U_1$ being the units digit in the number which expresses the output frequency of synthetizer, $U_2$ the tens digit and $U_{n11}$the N−1 row digit or next to the last digit. In the *n*th, or last decade, the carrier $F_o$ is eliminated so that the final frequency $F=10^nU_n+10^{n11}U_{n11}+\ldots 10\ U_2+U_1$ is obtained (in this definition, the unit is a whole decimal power of the hertz).

Each of the decades of such a known synthetizer constitutes a relatively complex circuit, comprising a "programmable" variable oscillator assembly (i.e., whose frequency can be regulated, for example, by application to a counting device functioning as a frequency divider of coded signals which define the different significant digits of the number which expresses the division ratio of this counting device), a modulator of the "phase detector" type and filters serving to eliminate the undesirable frequency components of the beat or beats.

It is an object of the present invention to provide a decade synthetizer of simplified construction, including a smaller number of components than the priorly known decade synthetizer and yet being more dependable in operation.

According to an important feature of the invention, in a synthetizer of the general type referred to above, the group consisting of one or more of the "head" decades (i.e., the first, second, etc.) essentially consists of a single oscillator unit cooperating with means for varying its frequency so as to obtain, without any beat with an intermediate frequency and without any injection of a carrier frequency, the variable frequency $f_o$+A to be applied to the following decade.

The simplified synthetizer, in accordance with the invention, thus comprises a single oscillator arrangement acting as *p* head decades (p being a whole number smaller than *n*), followed by n−p decades of the conventional type defined above.

It is another object of this invention to provide a phase detector or phase comparator particularly adapted for use as a part of such a simplified decade synthetizer, this phase detector possessing the remarkable feature of avoiding any introduction of interfering parasitic frequency modulation in the operation of the synthetizer.

According to another feature of the invention, such a phase comparator comprises: a first and second capacitors respectively connected to the drain and to the source of a field effect transistor whose control electrode is connected to a transistor so that said field effect transistor is blocked when said transistor is passing, and vice versa, said transistor being itself blocked when the forward front of the first of two recurrent signals, whose phase is to be compared and which passes in the absence of such a forward front, is applied to it; means for injecting a constant charging current from the first capacitor in the absence of the second of the two said recurrent signals, said means being connected to said transistor so that said constant current is interrupted when said transistor is blocked; and means for abruptly discharging said first capacitor during the duration of said second signal, the voltage at the terminals of the first capacitor being thus in the form of a linearly growing voltage interrupted by a brief plateau at each appearance of said forward front and the voltage at the terminals of said second capacitor indicating finally the value of said plateau, i.e., the phase-shift between said recurrent signals.

These and other objects of the invention will be more fully understood as a result of the following description.

In the appended drawings:

FIG. 1 is the block diagram of a frequency synthetizer according to an embodiment of the invention;

FIG. 2 diagrammatically illustrates the block which carries out the synthesis of the first significant digits in this synthetizer;

Figures 1, 2:
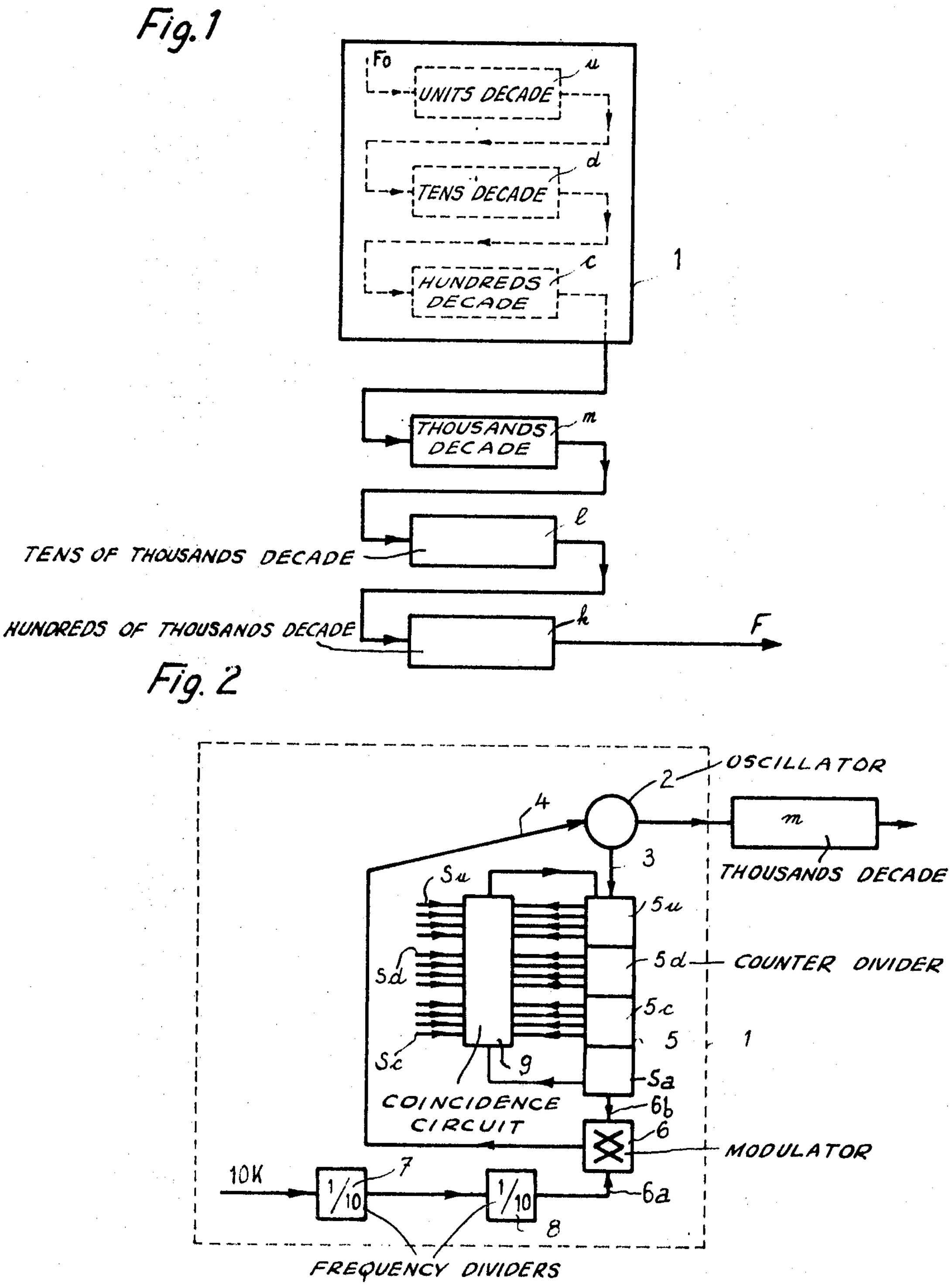

FIG. 1 shows, to set down ideas clearly and as an illustrative example, a frequency synthetizer designed to deliver a variable frequency F by steps of 1 Hz. up to 999,999 Hz. Such a synthetizer, constructed according to the known art, would comprise *n*=6 decades, that is, a decade *u* for units, a decade *d* for tens, a decade *c* for hundreds, a decade *m* for thousands, a decade 1 for tens of thousands and a decade *k* for hundreds of thousands. According to the invention, the first *p* decades are replaced by a single assembly. This assembly, symbolized by a block 1, will replace, for example, the first 3 decades *u*, *d* and *c*. These have been symbolized, inside block 1, by three dotted rectangles, so as to facilitate the explanation to follow; but, in fact, the whole block 1 will be constituted in the manner indicated in FIG. 2.

It is seen that it comprises an oscillator 2 which is servocontrolled, according to the technique known as "phase locking," by means of a loop connected between its output 3 and its frequency control input 4. This loop comprises a counter-divider 5 comprising *p*32 3 cascade connected conventional counting decades 5*u*, 5*d*, 5*c*, followed by a counting device 5*a* whose capacity is equal to or higher than 20 and a modulator 6 of the phase detector type. The latter effects the subtracting beat between the frequency originating from the counter-divider and an auxiliary standard frequency obtained by division through 100, by means of two scale-of-two units, 7 and 8, from a standard frequency $F_1$ of 10 kHz. which, as will be explained later, is also used in the decades *m*, *l* and *k*.

The counter-divider has a capacity which can vary by whole values for example from 20,000 to 20,999.

It will be shown later that the numerical example corresponds to the case in which the carrier $F_o$=2 MHz. This variation in counter capacity is programmed, in a manner known per se, by means of coded signals $S_u$, $S_d$, $S_c$ applied to a coincidence circuit 9.

Modulator 6 is advantageously of the type shown in FIG. 6 which will be described below.

It is obvious that, for each value of the ratio of division of the counter-divider, the frequency of oscillator 2 will adjust itself so that, after division, it will be equal to 100 Hz. The assembly finally provides, at the input of decade *m*, a variable frequency ranging from 2 MHz to 2.0999 MHz by steps of 100 Hz.

It is remarked that such a frequency is the one normally provided by decade *c* of a conventional synthetizer, with a carrier equal to 2 MHz. Indeed, in such a synthetizer, the decade *u*, to whose input the carrier $R_o$ is applied, adds to it an increment $10^4$U, U being the units digit in the number which expresses the frequency F. Decade *d* divides this increment by 10 and adds to it an increment of $10^4$D, D being the tens digit in the number which expresses frequency F. Finally, decade *c* in turn divides the increment which it receives by 10 and adds to it an increment $10^4$C, C being the hundreds digit. Frequency $F_o$+10 $^4$C+$10^{3ahD}$+$10^2$U is therefore finally obtained at the output of decade C, i.e., for $F_o$=2 MHz, a variable frequency ranging from 2 MHz to 2.0999 MHz. by steps of 100 Hz.

Thanks to the invention, it was possible, therefore, to replace the three conventional decades *u*, *d* and *c* by the much simpler assembly of FIG. 2, which does not use any injection of a carrier generated from an external source, and does not use any intermediate beat aside that which occurs in the phase locking loop of the oscillator, and, therefore, does not use any filter.

Figures 3, 4, 5:
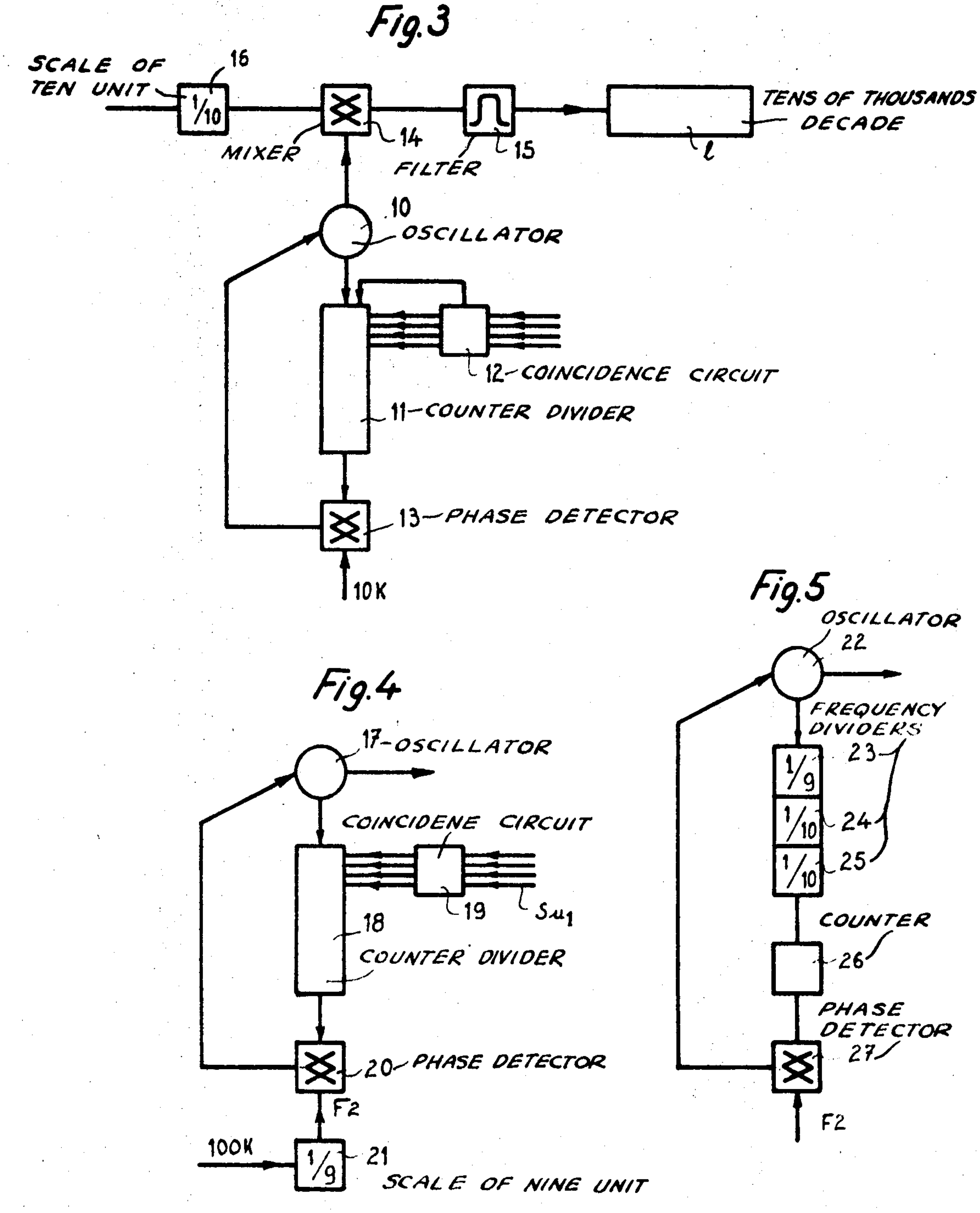
FIG. 3 is the block diagram of one of the decades which carries out the synthesis of the following digits.
FIG. 4 shows a particular embodiment of a head decade according to the invention.
FIG. 5 shows a varying embodiment of the block of FIG. 2.

The following decades *m*, *l* and *k* are conventional; decade *m*, for example, is built in accordance with FIG. 3.

It comprises a variable frequency oscillator 10 whose frequency is servocontrolled by a phase-locking loop comprising a counter-divider 11 programmed by means of a coincidence device 12 and a phase detector 13. The latter compares the output frequency of counter-divider 11 with the standard frequency of 10 kHz. mentioned earlier. By varying, through programming, the division ratio of the counterdivider 11 from 180 to 189, a variable frequency is obtained at the output of the oscillator, connected to a mixer 14, ranging from 1.80 (i.e. 0.9 $F_o$) and 1.89 MHz.

The mixer 14 carries out, in cooperation with a band-pass filter 15, the additive beat between this variable frequency and the frequency obtained through division, in a scale-of-10 unit 16, of the frequency $F_o$+$10^4$C+$10^3$D+$10^2$U originating from block 1 (FIGS. 1 and 2). A frequency $F_o$+$10^4$M+$10^3$C+$10^2$D +10 U is thus obtained, M being the thousands digit applied at the input of coincidence device 12.

Decade 1, constituted in the same manner, provides a frequency $F_o$+$10^4$L+$10^3$M+$10^2$C+10 D+U, L being the ten thousands digit.

Finally, decade *k* is constituted, in a manner well known per se, so as to eliminate carrier $F_o$ and to provide the final frequency F=$10^4$K+$10^3$L+$10^2$M+10 C+D+U/10.

It is self-evident that, in the example under consideration where *n*=6, *p* could be equal to 1, 2 or even 4.

The fixed frequency applied to the phase detector (6, FIG. 2) will, of course, in all cases, have to be equal to $F_1 110^{p11}$.

FIG. 4 shows a decade for units, of the type without any injection of carrier in accordance with the invention, but comprising, in addition, the feature which consists in providing a frequency of the form: $F_o$+$10^{n}\cdot$ 10/9·$U_1$, which can therefore vary by steps of 10/9 Hz. The value of this feature lies, as will be shown later, in the fact that it makes it possible, by associating this first original decade to a succession of conventional decades, to effect the synthesis of a frequency which, through multiplication by 9, gives a frequency expressed by a rational number. Frequency multiplication by an uneven number, especially by three or nine, is indeed, currently used in various applications, such as monitoring of a television transmitter.

The decade shown in FIG. 4 comprises an oscillator 17 whose frequency is servocontrolled by a phase locking loop constituted by a counterdivider 18 programmed by a coincidence device 19 and a phase detector 20 which receives a standard frequency $F_2$. A decade of the type shown in FIG. 2 is involved here, but with *p*=1, a single group of coded signals $S_{u1}$ (defining a value $U_1$, ranging from 0 to 8) being applied at the input of the counter-divider device 18. Furthermore, frequency $F_2$ is deducted from frequency $F_1$ mentioned previously through multiplication by 10/9×1/10$^1$, i.e., *p* being here equal to 1, by 10/9. It is therefore sufficient to start from the standard frequency of 10 kHz. used in the overall synthetizer and to multiply it by 10, and then divide it by 9 in a scale-of-nine unit 21.

In the numerical example under consideration, $F_1$=10 kHz. and, as a result, $F_2$=10 kHz. ×10/9. It is then only necessary to make it possible for the ratio of division of the counterdivider 18 to be programmed at values ranging from 180 to 188, so that the frequency provided by oscillator 17 can be programmed from 2 MHz to 2.088888 MHz per steps of 10/9 Hz.

In order to provide for a better understanding of a synthetizer comprising a units decade according to FIG. 4, followed by conventional tens, hundreds, thousands, tens of thousands and hundreds of thousands decades (i.e. of the type shown in FIG. 3), a numerical example of application will be given of it: assume, for example, that the irrational frequency: 327,444,444 ... Hz., is to be synthetized, which multiplied by 36 will give the rational frequency of 11.788 MHz.

In order to achieve this, display on the conventional decades of the synthetizer is simply effected with 3 as the digit for hundreds of thousands, 2 as the digit for tens of thousands, 7 as the digit for thousands, 4 as the digit for hundreds, and 4 as the digit for tens. On the special units decade, 4×10/9 will be programmed, thus giving the irrational value of 4.444 ... Hz.

It is self-evident that this method may be applied on a block, which is equivalent to *p* head decades, provided according to the principle illustrated in FIG. 2.

By way of example, FIG. 5 illustrates such a block, in the case where *p*=3. It is designed to provide a frequency $F_o$+10 $^4$C+$10^{3ahD}$+$10^2$×10/9 U.

The frequency of an oscillator 22 is servo-controlled by means of a phase locking loop comprising a cascade connected scale-of-nine unit 23 and two scales-of-ten units 24 and 25, followed by counter 26 whose capacity is equal to or higher than 20, and by a phase detector 27 which receives the fixed frequency $F_2$ equal to: $F_1$×10/9· 1/$10^1$, i.e. $F_1$/90, ($F_1$ being the standard frequency of the other decades of the synthetizer, which are conventional). The four units 23 to 26 constitute a divider by 18,000 which can be programmed, in a manner known per se, so that its ratio of division ranges from 18,000 to 18,000 per steps of one unit.

Under these conditions, the frequency produced by oscillator 22 ranges from 2 MHz to 2.1 MHz by steps of 10/9×$10^2$Hz, i.e. it is indeed of the form $F_o$+$10^4$C+$10^3$D+$10^2$+10/9 U, the digits U, D and C being respectively programmed on units 23, 24 and 25.

Figure 6:
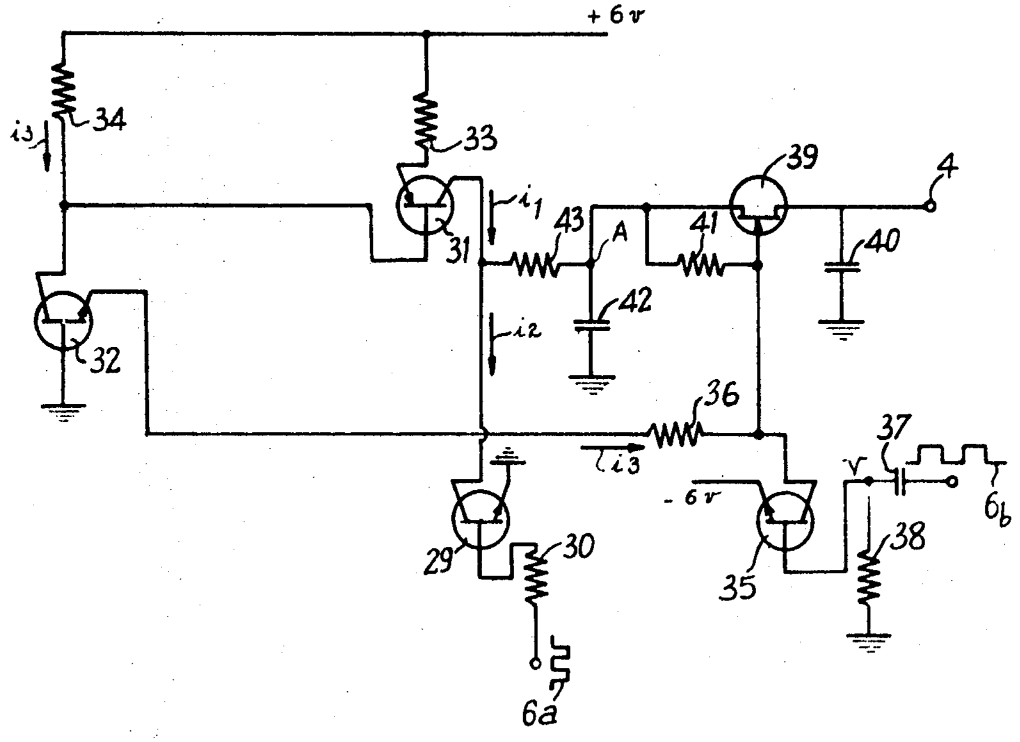
FIG. 6 is a circuit diagram of a preferred embodiment of a phase comparator employed in such a synthetizer.

FIG. 6 shows a preferred embodiment of the phase detector 6 of FIG. 2.

Terminal 6*a*(FIGS. 2 and 6) is connected, through a resistor 30, to the base of a transistor 29, whose emitter is grounded. The transistor collector 29 is connected to the collector of a transistor 31 whose base is connected to the collector of a transistor 32 whose base is grounded. A supply voltage, for example of +6 volts, is applied to the emitter of transistor 31 through resistor 33 and to the collector of transistor 32 through a resistor 34.

The emitter of transistor 32 is connected to the collector of a transistor 35 through a resistor 36.

A feeding voltage, for example of −6 volts, is applied to the emitter of transistor 35 while the base of this transistor is connected to the terminal 6*b* (FIGS. 2 and 6) through a differentiating circuit consisting of a capacitor 37 and a resistor 38.

The collector of transistor 35 is further connected to the control electrode of a field effect transistor 39 with type N channel, whose drain 4 is connected to the phase detector output (FIGS. 2 and 6). A capacitor 40 further grounds this drain.

The source of field effect transistor 39 is connected, on the one hand, to the collector of transistor 35 through a resistor 41, and, on the other hand, is grounded through a capacitor 42, and further connected to the collector of transistor 29 through a resistor 43.

In order to explain the operation of the of FIG. 6, it will be assumed first that no signal whatsoever is applied at 6*b*, but that recurrent rectangular shaped signals having a frequency of 50 Hz. are applied at 6*a*. Considering terminal A of capacitor 42, and neglecting the influence of resistor 43, which only serves to limit the discharge current from capacitor 42, it can be seen that this terminal receives, on the one hand, a continuous current $i_1$ and, on the other hand, a very strong short circuit pulsed current $i_2$ originating from transistor 29 which acts as a switch. Current $i_1$ is constant: indeed, this current is determined by current $i_3$ and the ratio of resistors 33 and 34.

Current $i_3$ is that which travels from the +pole to the −pole of the voltage source, through resistor 34, transistor 32, resistor 36 and transistor 35, which passes on a permanent basis in the absence of any signal on terminal 6*b*.

Figure 7:
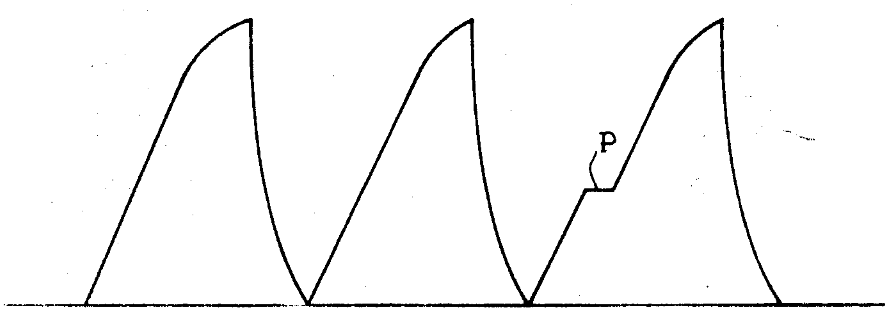
FIG. 7 illustrates waveforms which serve to illustrate the operation of the phase comparator.

As a result, the waveform of the voltage at A is as represented by the first two cycles in the curve shown in FIG. 7: linear rise in voltage from a substantially zero value (charging of capacitor 42 by $i_1$), followed by a rounded portion corresponding to saturation of transistor 31, and then by a rapid drop corresponding to the discharge of capacitor 42, etc.

If, during the rising portion of the curve, a negative wave front arrives at terminal 6*b*, it is transformed into a negative pulse by differentiator 37–38, and blocks transistor 35. Resistor 41 then returns the field effect transistor 39 control electrode to its drain voltage, so that this transistor becomes conductive. It then transfers on the capacitor 40, whose capacity is much below that of capacitor 42, the voltage present at that instant at point A. At the time of this transfer, current $i_1$ is suppressed: indeed, as the collector of transistor 35 is then raised to a potential higher than that of the ground, there is no longer any voltage drop at the terminals of resistor 26.

The waveform at A therefore shows finally, upon arrival of the pulse at 6*b*, a plateau P (FIG. 7). This plateau is the one that is stored at the terminals of capacitor 40. A voltage level proportional to the phase-shift between the signals applied to the respective terminals 6*a* and 6*b* is therefore finally obtained on the output terminal 4.

It should be pointed out that as the value of the voltage at A does not vary during its storage across capacitor 40, the residual alternative component, at terminal 4, of the pulse frequency is entirely negligible: below, for example, 1 mv for a pulse height of several volts. The phase comparator circuit, which has just been described, and therefore the remarkable property of introducing no interfering frequency modulation whatsoever into the phase locking loop of the synthetizer shown in FIGS. 1 and 2, which is very important in practice.

It is self-evident that various modifications may be devised by the skilled man without departing from the spirit and scope of the invention, as defined in the appended claims.

What I claim is:

1. A frequency synthetizer having *n* serially connected decades at least $n-p-1$ of which are each adapted for generating a frequency of the general type: $Fo+10^nU_{n11}+10^1Un-i-1+10\ U_2+U_1$, the *n*th decade being adapted to generate an output frequency $10^nU_n+10^{n11}\ U_{n11}+\ldots+10\ U_2+U_1$, *n*, *p* and *i* being integers, $U_1$ being the units digit, $U_2$ the tens digit and $U_n$ the *n* row digit of the number which expresses the said output frequency, Fo being a carrier frequency which is contained in the frequencies generated by each of the decades, excepting the *n*th decade, the *n* decades including *p* head decades followed by $n-p-1$ further decades in turn followed by the *n*th decade, each of said further decades comprising modulator means adapted for effecting at least one beat between a frequency proportional to the frequency Fo+ A originating from the preceding decade and at least one intermediate frequency, whereby the said further decades each generate a frequency Fo+A/10+B, A and B being frequency increments adapted to vary by integral steps, wherein the *p* head decades together form a single unit comprising: an oscillator having an output and a control input, variable capacity counter means having an input connected to the output of said oscillator, said counter means having an output, means for generating a standard frequency, divider means for dividing said standard frequency, and further modulator means adapted for effecting a beat between the frequency at the output of said counter means and the divided standard frequency, said further modulator means having an output connected to the control input of said oscillator.

2. A frequency synthetizer as claimed in claim 1, wherein each of said further decades comprise further oscillator means each adapted for generating a variable intermediate frequency 9 Fo/10+B, further divider means for dividing by ten the said frequency Fo+A, said modulator means being adapted for effecting the additive beat between the divided frequency (Fo+A)/10 and the said variable frequency.

3. A frequency synthetizer as claimed in claim 2, wherein the said standard frequency is further applied to the said further decades, the said divider means being adapted for dividing the said standard frequency by $10^{p-1}$.

4. A frequency synthetizer as claimed in claim 2, wherein the said standard frequency is further applied to said further decades, the said divider means being adapted for dividing the said standard frequency by $9/10^{p-2}$.

5. A frequency synthetizer as claimed in claim wherein said output of said counter means has recurrent rising edges and said divided standard frequency has recurrent maximal values, said further modulator means comprising: a field effect transistor having a drain, a source and a control electrode, first and second capacitors respectively connected to said source and to said drain, a transistor having a collector connected to said control electrode, differentiator means for transferring the said rising edges to the base of said transistor, supply means for injecting a constant current across the first capacitor, said supply means being collected to the collector of said transistor, whereby said constant current is stopped at the occurrence of each of said rising edges, and discharge means for abruptly unloading said first capacitor at the occurrence of each of the said maximal values, the control input of said oscillator being connected across the said second capacitor.

6. A frequency synthetizer as claimed in claim 5, wherein said discharge means include a second transistor having a collector connected to said supply means, a grounded emitter, and a base connected to said divider means.